United States Patent
Showghi et al.

(10) Patent No.: US 6,473,739 B1
(45) Date of Patent: Oct. 29, 2002

(54) REMOTE ORDERING SYSTEM

(76) Inventors: Robert S. Showghi, 13306 Benchley Rd., San Diego, CA (US) 92130; Scott Juds, 11536 Riviera Pl., NE., Seattle, WA (US) 98125

(*) Notice: Subject to any disclaimer, the term of this patent is extended or adjusted under 35 U.S.C. 154(b) by 0 days.

(21) Appl. No.: 09/857,509

(22) PCT Filed: Apr. 27, 2000

(86) PCT No.: PCT/US00/11337
§ 371 (c)(1),
(2), (4) Date: Jun. 1, 2001

(87) PCT Pub. No.: WO00/65514
PCT Pub. Date: Nov. 2, 2000

Related U.S. Application Data
(60) Provisional application No. 60/131,119, filed on Apr. 27, 1999.

(51) Int. Cl.[7] .............................................. G06P 17/60
(52) U.S. Cl. ............................. 705/26; 705/5; 705/15; 705/27; 705/44; 702/127; 358/442
(58) Field of Search ........................ 705/26, 27, 15, 705/44, 5; 702/127; 358/442

(56) References Cited

U.S. PATENT DOCUMENTS

| | | | |
|---|---|---|---|
| 4,086,475 A | * | 4/1978 | Churchill |
| 4,415,065 A | | 11/1983 | Sandstedt ................. 186/39 |
| 4,530,067 A | | 7/1985 | Dorr ....................... 364/900 |
| 4,553,222 A | | 11/1985 | Kurland et al. ........... 364/900 |
| 4,569,421 A | | 2/1986 | Sandstedt ................. 186/39 |
| 4,797,818 A | * | 1/1989 | Cotter |
| 5,198,976 A | | 3/1993 | Form et al. ............... 364/410 |
| 5,235,509 A | | 8/1993 | Mueller et al. ........... 364/405 |
| 5,504,589 A | | 4/1996 | Montague et al. ........ 358/403 |
| 5,664,110 A | | 9/1997 | Green et al. ............... 705/26 |
| 5,742,521 A | * | 4/1998 | Ellenby et al. |
| 5,845,263 A | * | 12/1998 | Camaisa et al. |
| 5,883,810 A | * | 3/1999 | Franklin et al. |
| 5,912,743 A | * | 6/1999 | Kinebuchi et al. |
| 5,918,213 A | * | 6/1999 | Bernard et al. |
| 5,969,968 A | * | 10/1999 | Pentel |
| 5,991,749 A | * | 11/1999 | Morrill, Jr. |
| 6,026,375 A | * | 2/2000 | Hall et al. |
| 6,085,976 A | * | 7/2000 | Sehr |
| 6,208,976 B1 | * | 3/2001 | Kinebuchi et al. |
| 2001/0018660 A1 | * | 8/2001 | Sehr |

FOREIGN PATENT DOCUMENTS

| | | | | |
|---|---|---|---|---|
| JP | 402098797 A | * | 4/1990 | ............. G07G/1/12 |
| JP | 402245967 A | * | 10/1990 | ............. G06F/15/21 |
| JP | 403110669 A | * | 5/1991 | ............. G06F/15/21 |
| JP | 405266324 A | * | 3/1992 | ............. G07F/9/00 |
| JP | 404169966 A | * | 6/1992 | ............. G06F/15/21 |
| JP | 08044798 | | 2/1996 | |
| JP | 08315046 | | 11/1996 | |
| WO | WO 953404 | | 12/1995 | |

OTHER PUBLICATIONS

Cavanaugh, Susan "Football concessions score with upscale, classic items" Nation's Restaurant News, vol. 28, No. 35, Sep. 5, 1994.*

(List continued on next page.)

*Primary Examiner*—Wynn Coggins
*Assistant Examiner*—Naeem Haq
(74) *Attorney, Agent, or Firm*—David A. Greenlee

(57) ABSTRACT

A system and method for enabling patrons at large-scale spectator events at confined venues having identifiable seats utilizes conventional or special hand-held, wireless communication devices to self-order food, drink and souvenir items from remote order fulfillment locations within the venue for delivery to identified seats. Hierarchical menus are provided for display of items for purchase on the devices. A seat identification code is associated with the order when transmitted via the existing telecommunications and Internet infrastructure. Receipt of the order is acknowledged, and a confirmation code is sent upon receipt of order delivery. There is automatic electronic payment for the order charged to a patron account that is established by prearranged means.

27 Claims, 4 Drawing Sheets

OTHER PUBLICATIONS

No Author, "Networking Essentials" Second Edition, Microsoft Press, pp. 120–122.*

No Author "Football concessions score with upscale, classic items." Nation's Restaurant News, Sep. 5, 1994, vol. 28, No. 35, p. 1 [retrieved on Dec. 21, 2001]. Retrieved from: Dialog File 9, Dialog Accession No. 01049590.*

No Author "What's New at the Ball Park for '93." PR Newswire Association Inc., Mar. 30, 1993. [retrieved on Dec. 21, 2001]. Retrieved from: Dialog Filed 813, Dialog Accession No. 0580278.*

No Author "New ballpark features high-tech gadgets galore." Crain's Cleveland Business, Mar. 28, 1994. [retrieved on Dec. 21, 2001]. Retrieved from: Dialog File 16, Dialog Accession No. 0394638.*

* cited by examiner

PROPOSED AMENDED DRAWINGS

PROPOSED AMENDED DRAWINGS

PROPOSED AMENDED DRAWINGS

PROPOSED AMENDED DRAWINGS

| Welcome To<br><br>dial4snax.com<br><br>Enter Venue ID:<br>  863 183 | KingDome<br>Seattle, WA<br>Seat Location?<br>Section:  10<br>Row:  17<br>Seat:  9 | Please Confirm<br>KingDome<br>Section:  10<br>Row:  17<br>Seat:  9<br>Yes         No |

REMOTE ORDERING SYSTEM

CROSS REFERENCE TO RELATED APPLICATION

This application claims priority of U.S. Provisional Patent Application No. 60/131119, filed Apr. 27, 1999.

Background of the Invention

1. Field of the Invention

This invention relates to the remote ordering of goods and more particularly, to a remote ordering method and system in which patrons utilize wireless hand-held devices to order menu items at large venues, which have identifiable seat locations, for delivery to their seats.

2. Description of Related Art

Sporting events, concerts and other large gatherings of spectators, or patrons take place in an arena, stadium, or other confined facility or venue having seating in uniquely identifiable seats, which are usually reserved or assigned. At these events, the ability of patrons to secure refreshments in the form of food and drink is limited. It is customary for hungry and thirsty patrons to await the arrival of roving vendors who intermittently traverse the aisles of the facility hawking various items of food and drink. These vendors frequently carry only a single type of food or drink. Often a wait of many minutes must be endured until a vendor appears who, hopefully but infrequently, has the item sought. Even then, the vendor may not have the correct change and considerable disruption occurs to those other patrons seated between the purchaser and the vendor. This is a very ineffective and inefficient method of ordering and delivering items of food, drink and merchandise to patrons.

The other method of obtaining food or drink is to queue up in long lines at refreshment or concession stands, which are scattered outside the main area in the hallways of the venue, where several but not all types of refreshments can often be purchased together at a single stand.

It is also common for venue operators to sell souvenir merchandise, such as programs, pennants, T-shirts, caps, trinkets, and CDs. These may also be occasionally purchased from the roving vendors in the facility, but, more often, must be purchased from a merchandise or concession stand elsewhere in the facility. However, it is seldom possible to purchase all of these items at a single concession stand.

As a result, a patron wishing to purchase several different types of food and drink and some items of merchandise must wait for multiple vendors and also visit multiple stands, probably missing seeing part of the event taking place in the venue. Thus, there is a need for a system whereby patrons can order items from a remote location for delivery to their seats.

Remote ordering systems, in which items are ordered from a location remote from item supply, are known in the prior art. However, these systems do not address the problems outlined above. For example, U.S. Pat. No. 5,664,110 discloses a remote ordering system intended for use by homeowners or businesses to facilitate ordering from multiple vendors without the need to travel to the vendor. This patented system is similar to current systems of placing orders from a business office computer environment over the Internet or other telecommunications links using complex menus to obtain numerous parts from numerous possible business suppliers and vendors. This is distinctly different from the problem of a patron remotely ordering food, beverages and souvenir menu items from vendor facilities located in the same building structure for delivery to the patron's seat. Furthermore, this system is unduly complex in that it requires use of secondary data input devices, such as bar code scanners and the like to input desired product codes.

The remote order terminals described in U.S. Pat. Nos. 4,415,065 and 4,569,421 are intended and suited for use by the employees serving the customer/patron, rather than for use by the patron himself For example, in its restaurant application, the patron uses a wireless paging system to summon the employee operating the remote order terminal. The order function is then carried out by the employee, but does not address the problems described above, since an intervening employee action is required U.S. Pat. No. 5,235,509 discloses a customer self-ordering system. However, this patent teaches use of a kiosk-style touch screen monitor self-ordering system for places such as fast food restaurants. This would require patrons to leave their seats, and, consequently, does not address the problems described above, since the patron must leave his seat and journey to a fixed location to order.

There is a need for a system whereby patrons having identifiable seats in a venue can send an order for various menu items, such as food, drink, souvenir merchandise, and services from their seats to a remote order fulfillment location and have the order delivered to their seats. There is also a need for this system to include a provision for remote payment for the order, to eliminate the distraction and hassle of engaging in a cash-and-change situation in the venue.

BRIEF SUMMARY OF THE INVENTION

It is, therefore, an object of this invention is to provide a system whereby patrons having identifiable seats in a venue can self-order various menu items of food, drink, souvenir merchandise, and services from their seats to a remote fulfillment location and have the order delivered to their seats.

It is another object to provide a system which includes a provision for remote payment for the order.

It is a further object of this invention to provide a system with which patrons can review a visual and/or audible menu of the available tangible and intangible items of food, drink, merchandise and services without leaving their seats.

In one aspect, this invention features a remote ordering system for patrons at a large-scale venue having identifiable seats in which a patron uses a handheld electronic communication device, which displays or announces a full menu of items offered, to order selected items. The order includes identification of the items ordered and the seat location or patron identification, and is transmitted to a central order-fulfilling site, where the order is assembled and thereafter delivered to the patron at the identified seat location. Payment is done by a prearrangement involving prepayment, credit line, or the preauthorized use of a credit or debit card.

In another aspect this invention features a remote ordering system comprising a plurality of portable, wireless, handheld, patron-operated remote communication devices, each of which has a batten, a display and/or speaker for presenting a plurality of menus listing items for sale, and/or offering services, function keys for navigating the menus and selecting items to be ordered, and wireless means of communicating the order to a remote order processing station and receiving confirmation of order receipt, a transceiver at the processing station for communicating with the ordering devices, and a computer for processing the orders and arranging payment for the order.

The remote ordering devices may be special purpose hand-held devices especially designed for use in this system, or, alternatively, may be conventional hand-held wireless communication devices, such as cell phones, two-way pagers, or portable digital assistants (PDAs).

It is contemplated that special purpose devices would be available to those patrons who do not carry one of the conventional devices. These special devices would be prepared for each event at a central location, having battery charging and menu programming capability, and transported to kiosks near patron entry points in the venue. The kiosks would each be rental contract stations to secure deposit and payment terms (cash, credit/debit card, etc.), and patron seat location information for rental of the special devices to patrons prior to start of the event, and collection of the special devices after conclusion of the event.

The special devices carry means for audibly reminding patrons to return the special devices to prevent their inadvertent removal from the venue. To accomplish this, at the end of the event in the venue, a signal is transmitted to the special devices to sound an alarm signal as a reminder to return the device to a kiosk. Failure of a patron to return the special device within a predetermined time period would automatically effect a charge to that patron's account.

In a system which accommodates cell phones, pagers and PDAs, the central processing station would include a first server at an internet service provider, which receives data communications from the cell phone, two-way pager, or PDA service provider, and a second server located at the venue.

Preferably, the system includes a provision for confirming receipt of an order, and a provision for confirming order delivery/receipt, regardless of the type of communication device used.

These and other objects and features of this invention will become more readily apparent upon reference to the following detailed description of a preferred embodiment as illustrated in the accompanying drawings, in which:

DESCRIPTION OF THE PREFERRED EMBODIMENT

Figure 1:
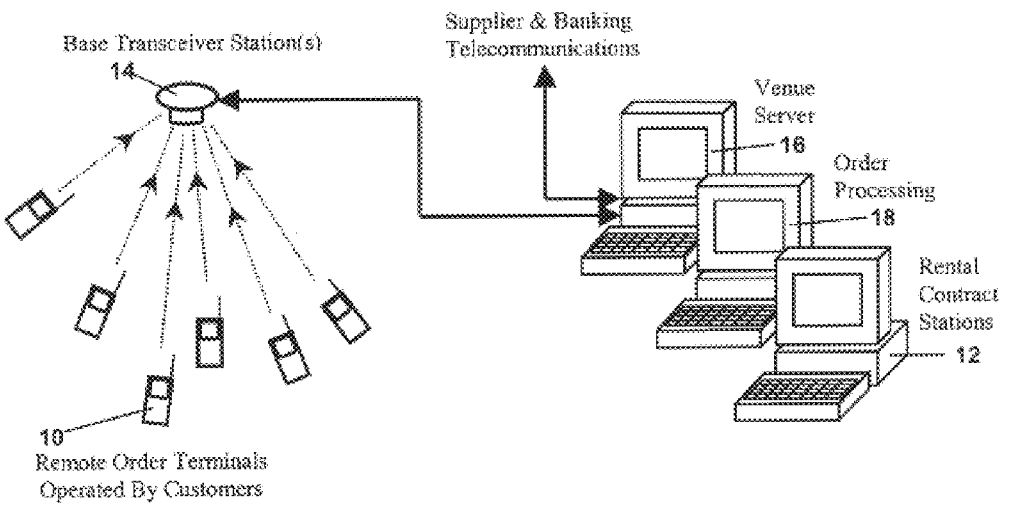
FIG. 1 a diagram of a remote ordering system according to this invention which is based on a custom, application-specific, local area wireless data communication network, using special design wireless, patron-operated remote communication devices.
Figures 3A, 3B, 3C, 3D:
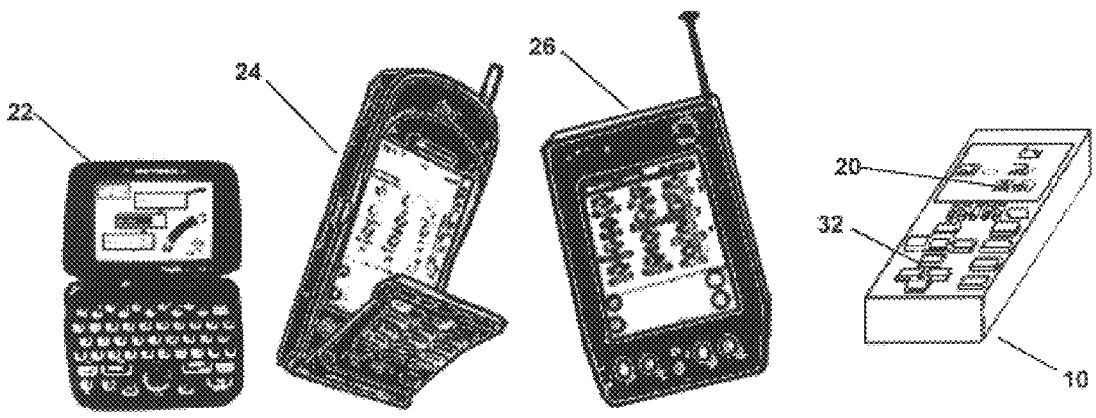
FIGS. 3a, 3b, 3c and 3d are depictions of various wireless, hand-held communication devices having displays, which useful in the remote ordering system of this invention depicted in FIGS. 1 and 2.

FIG. 1 shows a system that uses a custom, application specific, local area, wireless data communication network. As patrons arrive for at a venue/facility for a concert, game or other event, they will be presented with the opportunity to obtain a battery-operated wireless remote ordering device 10, illustrated in FIG. 3d, which will be available at a kiosk having a device rental station 12. Devices 10 are operable, as later described, to communicate an order for menu items to a transceiver node 14, which communicates orders from multiple remote ordering devices 10 to a fulfillment center having server 16 and order processing computers 18. In this embodiment, the remote ordering devices 10 and the base transceiver nodes/stations would be designed specifically for this application using available transceiver chip sets, and other off-the-shelf components such as keypads, microcontrollers, displays and the like which are commonly known to those skilled in the art. In FIG. 1, the base transceiver nodes 14 and other client work stations are networked to the local server computer 16 which maintains system records and facilitates the overall operation of the system.

These special devices 10 are stored in a combination battery charger/programming unit, or docking station, which keeps the devices' batteries charged and provides the current menu of items offered for sale, which can be selectively presented for viewing on the device's display screen 20 or audibly via a speaker in the device. Ideally, a kiosk 12 would be prominently located adjacent each entrance to the venue. The special hand-held, wireless remote ordering devices 10 may take the form illustrated in FIG. 3d, and include the display 20, a plurality of alpha-numeric operation keys 32 for displaying and scrolling through menus, indicating item and quantity, and controlling the ordering process. In addition a microphone can be provided for voice ordering.

At this time, venue personnel will normally prearrange for payment for items subsequently ordered by the patron, and secure payment information in case the device 10 is not returned to the kiosk after the event has concluded. This may take the form of use of a credit or debit card, deposit of a predetermined amount of cash, or, for frequent patrons, tap a preestablished line of credit. The identification number of the wireless remote ordering device issued to the patron may then be recorded and the seat location identification entered into the device 10. The patron will then proceed to the seat and view the event.

Figure 2:
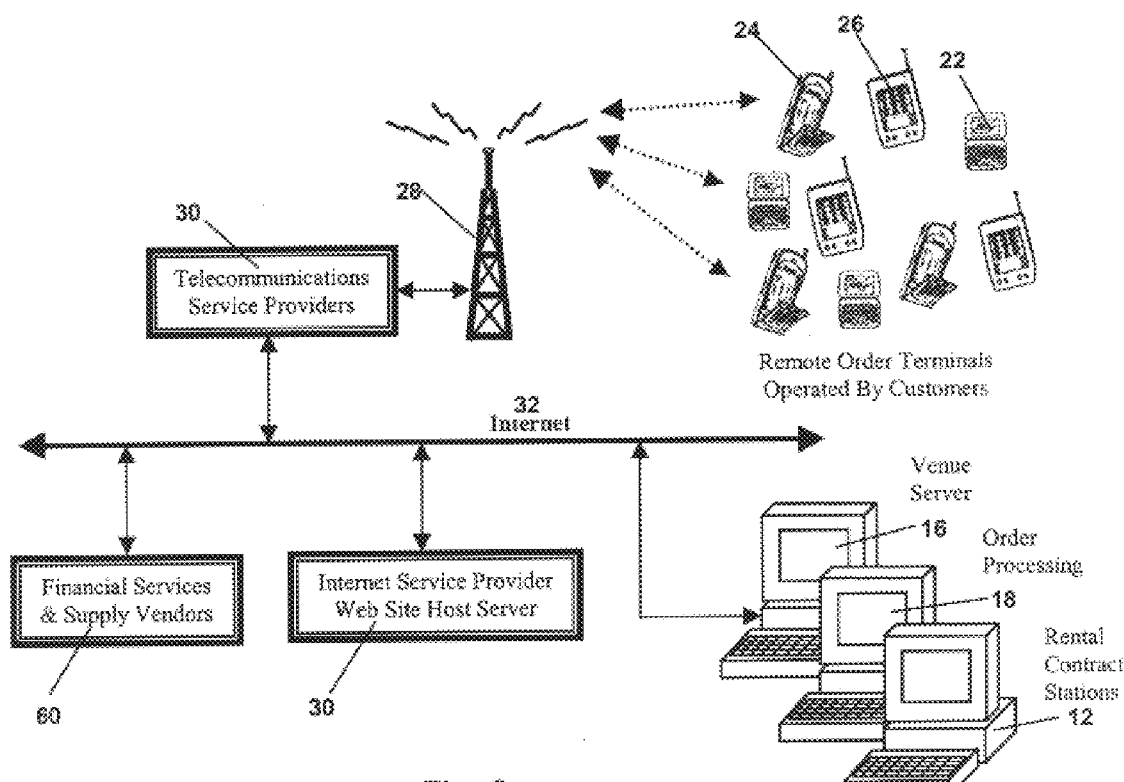
FIG. 2 is a diagram of a remote ordering system according to this invention which is based on existing wireless hand-held telecommunications and internet structure using cell phones, two-way pagers, PDAs and the like wireless, hand-held communication devices.

FIG. 2 illustrates a system that is based on the existing wireless telecommunications and Internet infrastructure. In this system conventional hand-held wireless communication devices, such as two-way pagers 22 (FIG. 3a), cell phones 24 (FIG. 3b) and PDAs 26 (FIG. 3c) would also be useful as remote ordering devices. Here orders would be received by a base transceiver station 28. These signals would be transmitted by service providers 30 on the internet 32 to the venue fulfillment center server 16 and order processing computers 18.

With the advent of advancing voice recognition technology, it is contemplated that orders could be transmitted orally via microphones in the devices. Also, the menus could be announced via speakers in the devices, for benefit of the visually impaired, or voice prompts could be provided as the visible menus are traversed to enhance the ordering process.

Although the capabilities of this combined infrastructure is in its infancy, it is believed that its current rapid market acceptance will not only make it a viable backbone on which to operate the remote ordering system of the current invention, but will in addition afford significant development cost savings to deploying such a system As there are many suitable alternatives on which to base an embodiment of the current invention which are known to those skilled in the art, the specific wireless technology used, the specific multiple access communication protocol used, and the specific client/server hardware interface and protocol are not important to the method of the invention so long as they support the required functions. What is important is the method of this invention by which the customer is provided better service.

The FIG. 2 system would be used in addition to the FIG. 1 system, which would still provide special devices 10 to accommodate those patrons arriving at an event without the conventional communication devices 22, 24 and 26.

A venue ticket conveniently will have a serial number which carries a code identifying venue, date and seat location information. Customers having their own compatible communication device 22, 24, 26 need only enter this serial number into the device and provide payment information when ordering items. Otherwise, as patrons arrive for an event, interested parties who do not already have a compatible wireless remote ordering device 22, 24, 26 may stop at a kiosk 12 offering special rental wireless remote ordering devices 10 and open a charge account with which is associated the seating location of the patron and the identification number of the device 10 issued to the customer.

Payment/credit information can be verified at the convenience of the venue such that the issuance process is speedy, yet identify a credit problem early prior to delivery of an order and prevent discovery of a payment problem later. In addition to use of common credit and debit cards as means of payment, corporate accounts and billing through third party accounts such as the customer's internet service provider or cellular telephone service provider may possibly be arranged when the transaction is processed with these services.

Figure 4:
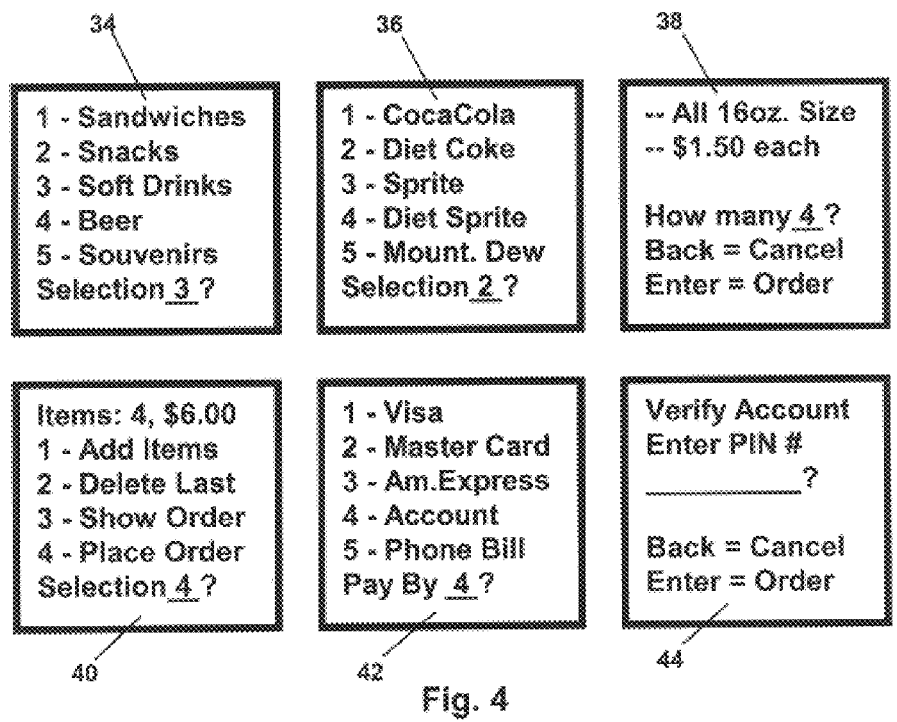
FIG. 4 is a sample series of menus of items available for order and purchase, which can be presented to the devices of FIG. 3.

FIG. 4 displays sample hierarchical menus that are programmed into special remote ordering devices 10 and illustrate the variety of functions possible. The menus include a major item classification menu 34, a drink menu 36 and sub-menu 38, a control menu 40, a payment menu 42 and a verification menu 44. These menus are also transmittable through the FIG. 2 system for display on or announcement by conventional hand-held wireless devices 22, 24, 26 brought into the venue by patrons.

This system of menus, carried by or transmittable to the remote ordering devices, enables patrons to easily select any quantity and variety of items at any time while in the venue, order and pay for the items, all without moving from the patron's seat. Also, orders may be placed from any location within the venue by a patron for delivery to the patron's seat. This contrasts with systems where orders are taken by order-taking personnel, such as wait staff, but only from the patron while the patron is seated.

As hierarchical menu systems have become common with the advent of automated teller machines and windowed -graphical user interfaces on modern computer operating systems, the concept will not be further described here. If one of the conventional devices 22, 24, 26 are used, the menus can be accessed by dialing a source number provided to the patron, either on the admission ticket, event program, or on signs in the venue.

Figure 5:
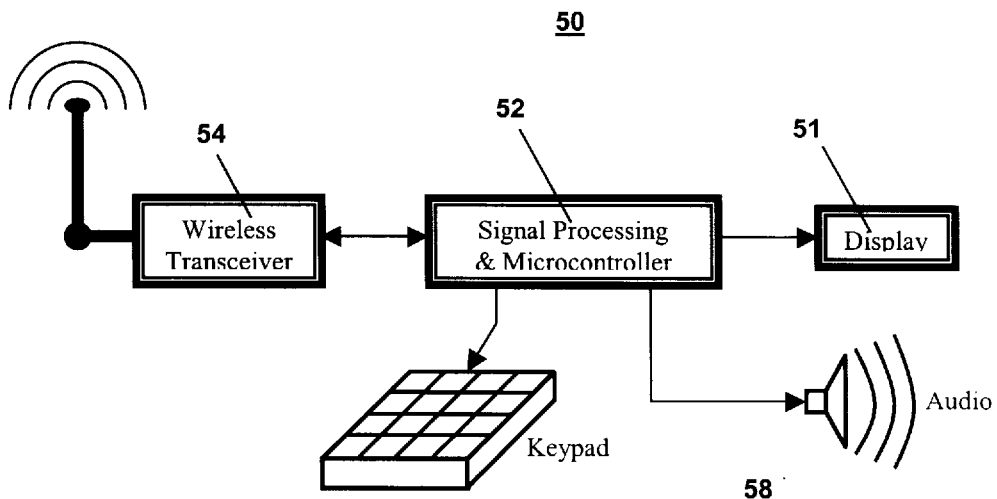
FIG. 5 is a block diagram of a wireless, hand-held communication device, having a display and a speaker for displaying and/or announcing menu offerings.

An example remote ordering device 50 useful in the system and method of this invention is illustrated in FIG. 5. It includes a microprocessor 52, a transceiver 54, a display 50, and a speaker 58. Device 50 transmits and receives information preferably via infrared or radio transmission. As can be readily seen, there are numerous types of commercially-available devices which fulfill the functional definition of the remote ordering device of the system of this invention. One or more remote order transceiver nodes 14 are each used to communicate with numerous of the remote ordering devices by means that avoid overlapping transmission conflicts, such as time division multiplexing, polling, collision detection and avoidance, all of which are well developed technologies and well known to those skilled in the art. In the FIG. 2 embodiment where the wireless communication infrastructure is used, the base transceiver nodes 14 become embodied as the various service provider transceivers 28 used to communicate with cellular telephones, two-way pagers, PDAs and the like.

Most venues will necessarily have several order fulfillment centers. As venues can be quite large, it would be impractical to deliver all orders from a single processing location, but rather to have multiple locations in a large venue in order to keep proximity to the customer, and thus the route for physical delivery, reasonably minimized. To assure prompt and accurate delivery of orders, it is necessary to identify the location of the patron's seat to determine which order fulfillment center within the venue to send the order to.

An Identification Code is required to specify, the patron's seat location. Both the venue location and the specific seat location are needed. There are developments underway in the US in response to the FCC's E911 mandate that will probably allow automated venue identification via automatic location of a cellular phone. However, this system, for now, is specific to the US and may not be operational in all areas for quite some time. This might not be as useful as it seems, since it would unduly limit a patron to ordering only when in his specific seat. In any case, there is a need to identify the order delivery location, which, in this case is most reasonably determined to be the patron's seat location.

A survey of stadium and arena seating maps shows that there are generally 50 to 150 sections, 20 to 40 rows in a section, and 10 to 30 seats in a row. Allowing for a little overage in each category, multiple events per day at the same venue and a few check digits in the code, one might construct a simple Identification Code as outlined in Table 1 below. When the order is finally delivered, confirmation of receipt of delivery is achieved by communication of the last 4 digits of the Identification Code to the delivery person.

TABLE 1

| CONSTITUENT PARTS OF THE IDENTIFICATION CODE | | | |
|---|---|---|---|
| Field | Bits | Range | Comments |
| Venue | 13 | 1–8, 192 | Super large venues could use two values |
| Section | 8 | 1–256 | Typical venue has 50 to 150 total |
| Row | 6 | 1–64 | Typical venue has 20 to 40 per section |
| Seat | 6 | 1–64 | Typical venue has 10 to 30 per row |
| Check | 7 | 1–128 | Date dependant checksum or CRC digits |
| Total | 40 | 1,099 billion | Basically, 12 digits, e.g. 987-5432-1098 |

Figure 6:
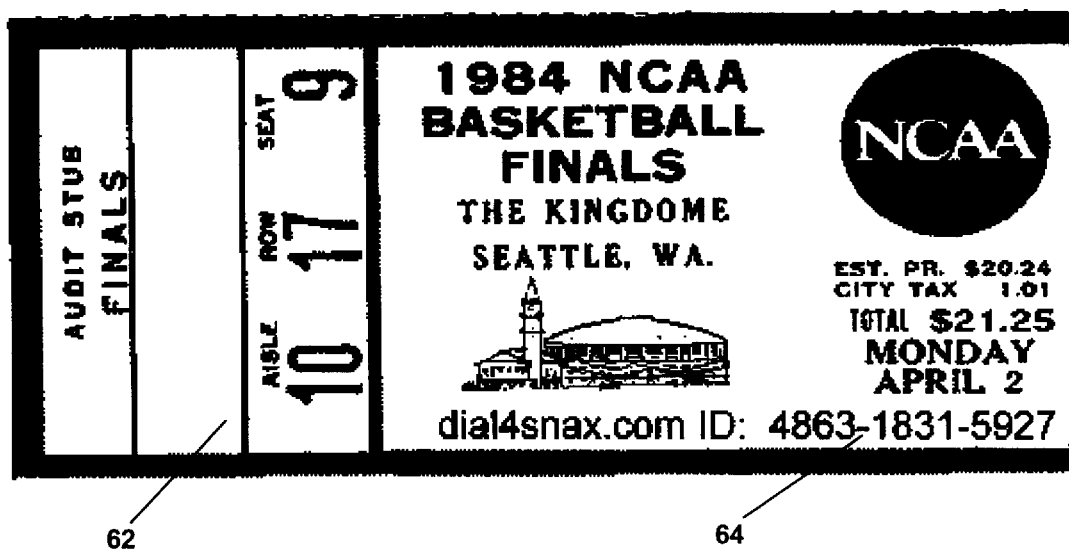
FIG. 6 an example venue admission ticket displaying a full venue and seat identification code.

The example ticket 62 in FIG. 6 shows the printing of the Identification Code 64 on the ticket in three groups of 4 digits to aid in data entry accuracy. Each ticket printing location must have the capability to generate the Identification Code from a standard algorithm and print it on the ticket. This will require collaboration with each stadium's ticket office and alternative ticket sources, such as TicketMaster®.

Figures 7, 8:
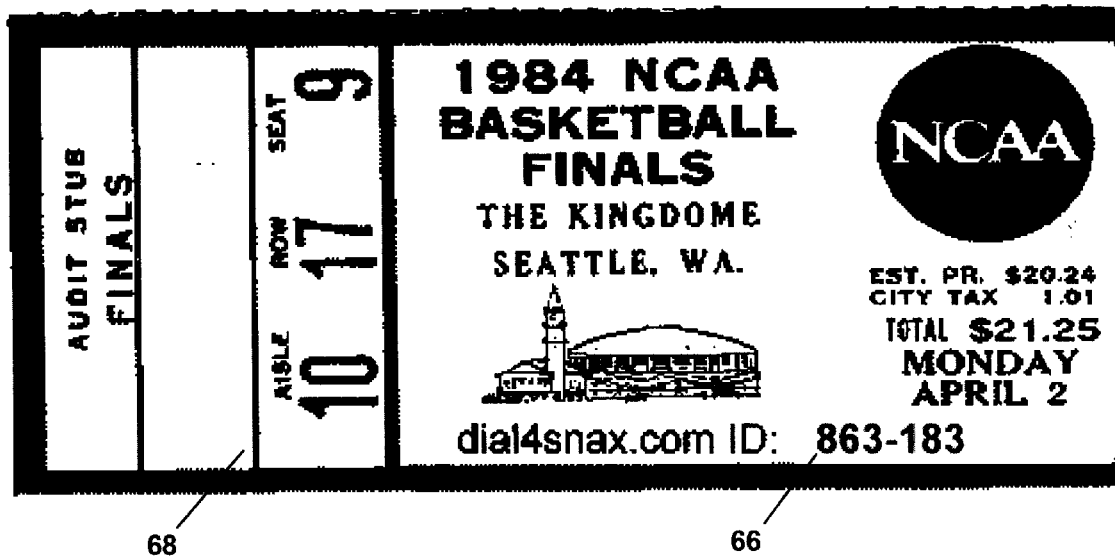
FIG. 7 is another example venue admission ticket displaying a venue-only identification code.
FIG. 8 is an example series of menus for identification code entry.

An alternative embodiment of Identification Code might only include the addition of a venue Identification number 66 to another example ticket 68, as shown in FIG. 7. In this case the venue identification number would preferably include check digits to verify proper entry; the patron would directly enter the section, row, and seat information from ticket 66, with verification being done by return prompt as suggested in FIG. 8.

Although the primary description here is in terms of a hand held wireless transmitter with a keypad and display such as the emerging WAP (wireless application protocol) web enabled cellular telephones, it should be recognized that voice recognition CTI (computer telephony integration) technologies can enable automated navigation and data entry in verbal format for spectators with older cellular telephones.

At any time during the event, the patron can page/scroll through the hierarchical menus displayed on or announced by the remote ordering device and use its various keys or audible commands to identify and select items for ordering, review the order, transmit the order, and receive confirmation that the order has been accepted for processing. As is well understood by those skilled in the art, the simple menu system as portrayed in FIG. 4 relates to the limited display capabilities on today's mini-browser cellular telephones and related devices. However, as time moves on, much higher text densities, graphics, and even color will become commonplace and represent only the natural evolution of the method of this invention. As hierarchical menu systems have become ubiquitous with the advent of automated teller machines and windowed graphical user interfaces on modern computer operating systems, the concept will not be further described here.

Menu items that can be offered can comprise the usual items of food, drink souvenir merchandise, but can also include tickets to future events, and services, such as restaurant, lodging and transportation reservations, advertising of all kinds, and statistical data during sporting events, biographical and recording data for concert artists, future schedule of events, and myriad other information. This information can be conveyed visually, audibly, or via a combination of both media forms.

An order transmitted by one of the remote devices received by the venue server 16 contains the ticket identification code, which allows the order fulfillment personnel to correlate the order with the credit information and the seat delivery information. The items on the order are displayed on the order-processing computer 18 for fulfillment personnel. Thereafter, the order is filled and a delivery person delivers it to the patron at the patron's seat. Upon delivery, the patron is asked to acknowledge delivery via the remote ordering device 10, 22, 24 or 26 to confirm delivery. The acknowledgement preferable automatically authorizes a charge to the patron's account, such as through internet connection to a financial services provider 60, as in FIG. 2.

At the end of the event, patrons having a conventional communication device 22, 24, 26, merely pocket their devices and exit the venue. Those patrons having borrowed special devices 10 will return them kiosk 12. If a patron should inadvertently exit the facility without returning remote ordering device 10, this will be detected, either through loss of signal or detection of a special signal, such that it will initiate emission of audible beeps to remind the patron that unit 10 should be returned to kiosk 12.

Although device 10 is illustrated as a hand-held unit, it could be augmented by addition of a strap or cord to hang around the patron's neck or attach to other portions of the body, thus reducing the incidence of dropping the unit during celebration or applause. This would also reduce incidences of patrons leaving units 10 at their seats and forgetting to return them to kiosk 12.

Many benefits accrue through use of the system and method described herein: Patrons receive a higher level of service by having the ability to order, receive, and pay for any combination of items that are available at the event without having to leave their seats, stand in line, miss portions of the event, or be limited to only cash on hand. The remote ordering system and method of this invention eliminates the delays, frustration and sheer inconvenience of the current system, which requires patrons to await roaming vendors or endure long lines at inconveniently-located concession stands.

Patrons with special needs would also benefit from the easy-to-use, alphanumeric, Braille keypad that could be provided by this system. It would eliminate their need to walk, stand in line, verbally communicate, depend on a seeing person for placing their order, or be involved with cash transactions.

Organizers of these events and facility owners would benefit by being able to charge more for those seats that are located in sections of the stadiums, concert halls, and amphitheaters that are equipped with this system Event sponsors would further benefit from the ability to advertise and sell their special event-related items off the device merchandise menu list, sell tickets to future events, present event-related information, and offer advertising, reservation, announcement and advertising.

Vendors of snacks and gift items at these events would also benefit from higher sales levels since:

a. Patrons who historically would not leave their seats, dreaded standing in line, and did not want to miss portions of the event in order to buy their items, could employ this system to facilitate their shopping;

b. Patrons who do not make a point of carrying enough cash on them, could make credit card purchases using this system;

c. Patrons who came in as part of a group or as corporate representatives needing to spend all their time with their clients, could use this system to facilitate their ordering and payment process without having to leave their client or the event, and d. Patrons could order from any location within the venue for delivery to their seats.

Although only a preferred embodiment has been described in detail many modifications are contemplated within the scope of this invention, as defined by the following claims.

What is claimed is:

1. A system for the remote ordering of items from a menu for delivery from one of a plurality of order fulfillment centers located in a spectator venue having identifiable seats occupied by event patrons, said system enabling a patron to use a wireless, hand-held communication device, having means for presenting the menu visually and/or audibly, to self-order menu items for delivery to an identified seat, comprising means for associating an identification code for the identified seat in said venue with an order, an order-processing computer for providing a menu of items offered for sale to said device and for receiving orders for selected items transmitted from said device and for communicating said order to order fulfillment center personnel, means for confirming order receipt by the computer to the device from which the order was received, at least one transmitter/receiver node for receiving orders from a plurality of said devices and communicating them via said computer for display to order fulfillment center personnel for subsequent order delivery to said identified seat location, means for providing patron payment account information to said computer in association with said order when said order is placed, and payment charging means for automatically charging the cost of an order to said payment account without intervention by the patron or order fulfillment personnel apart from delivery confirmation.

2. The system of claim 1, including means for automatically selecting and then directing patron's order to one of said plurality of venue order fulfillment centers, one basis for the selection of which is providing prompt delivery providing prompt delivery to the patron's seat.

3. The system of claim 2, including means for confirming delivery of the order to enable said payment charging means.

4. The system of claim 1, wherein patrons have entry tickets and the seat identification code includes a series of alphanumeric characters printed on the ticket, separate and distinct from the standard section-row-seat location information.

5. The system of claim 1, including patron database means containing patron payment account information preexisting said order, a patron seat location identification code, and patron wireless communication device identification information.

6. The system of claim 5, including means to receive wireless communication device information identification associated with said order for use with said patron database means to automatically provide at least one of said seat identification code and patron payment account information.

7. The system of claim 5, wherein the patron seat location identification code includes check digits to ensure authenticity and integrity of said code.

8. The system of claim 1, including means for determining availability of delivery service to the patron's seat based on its location.

9. A system for the remote ordering of items from a menu for delivery from one of a plurality of order fulfillment centers located in a spectator venue having identifiable seat locations occupied by event patrons, said system enabling a patron to self-order selected menu items, for delivery to an identified seat, using a wireless, hand-held communication device that has means for presenting the menu to patron visually and/or audibly, comprising an order-taking computer for communicating with said device including means for interactively transmitting lists of menu items for presentation to the patron, and means responsive to the patron's selections for assembling a completed order including a selected payment method, means for associating an identification code, for identifying the identified seat location in said venue, with said order, an order-processing computer, distinct from said order-taking computer, for receiving and communicating an order, including seat location, to order fulfillment center personnel;

means for confirming order receipt by said order-processing computer to said device from which the order was received;

at least one wireless transceiver node for receiving orders from a plurality of said devices and communicating them to said order-taking computer, and means for enabling the patron to provide payment account information for use in association with said order when said order is placed, and means for automatically charging the cost of said order to said payment account without intervention by said patron or order fulfillment-personnel apart from delivery confirmation.

10. The system of claim 9, wherein said wireless transceiver node is part of the existing wireless communications infrastructure.

11. The system of claim 9, wherein said communication device is one of a plurality of conventional wireless communication devices having general utility apart from said system, including a cell phone, two-way pager, and wireless PDA.

12. The system of claim 9, wherein said order-taking computer is an internet connected server hosting an order-taking application.

13. The system of claims 10, 11 or 12, including means for automatically selecting one of multiple venue order fulfillment centers to receive the, one basis for the selection of which is providing prompt delivery prompt delivery to the patron's seat.

14. The system of claim 10, 11 or 12, including means for confirming delivery of the order to enable said payment charging means.

15. The system of claim 10, 11 or 12, including patron database means, which preexists said order, containing patron payment account information, patron seat identification code information, and patron wireless communication device identification information.

16. The system of claim 15, including means to receive said wireless communication device identification information with said order for use with said patron database means for automatically further providing at least one of said seat identification code information and patron payment account information with said order.

17. The system of claim 9, further including venue identification means for use with said order-taking computer in determining availability of service to said identified seat.

18. The system of claim 9, wherein each patron has an entry ticket and the seat identification code includes a series of alphanumeric characters, separate and distinct from the standard section-row-seat location information, printed on the ticket.

19. The system of claim 9, including means for confirming availability of delivery service to the patron's seat based on its location.

20. A method of remote ordering of items by a patron from a menu for delivery from an order fulfillment center at a spectator venue having identifiable seats, where the patron has a wireless, hand-held communication device having means for presenting the menu to patrons visually and/or audibly, comprising the steps of providing menu item information for reception, presentation and selection by said device, using said device to place an order with said fulfillment center for selected menu items, associating an identification code for a seat in said venue to use with the order to identify order delivery location, providing patron payment account information for use in association with the order when placed, confirming acceptance of a patron's order to said device, the order including the selected menu items, the seat location identification code, and the payment account information, communicating the order and said seat location to order fulfillment personnel, processing the order for fulfillment, delivering the order to the identified seat location, confirming order delivery, and automatically charging the cost of the order to the patron's payment account without intervention by the patron or order fulfillment personnel apart from delivery confirmation.

21. The method of claim 20, including the step of determining availability of delivery service for a patron's seat location.

22. The method of claim 20, including the step of selecting one of multiple venue fulfillment centers for fulfillment of the order, one basis for the selection of which is providing prompt delivery to the patron's seat location.

23. The method of claim 20, including the step of entering an alphanumeric code taken from the event entry ticket by the patron into said device to identify the patron's seat location, separate and distinct from the standard section-row-seat location information.

24. The method of claim 20, including the step of entering payment account information into said device by the patron, at the time of ordering, for charging the cost of said order to the payment account.

25. The method of claim 20, including the steps of creating a patron database of information to be associated with subsequent orders, entering a patron's seat identification code into said patron database for later association with an order, automatically receiving identification information for said device when the order is placed, and using said device identification information to reference the identified seat location in said patron database for association with the order.

26. The method of claim 20, including the steps of creating a patron database for information to be associated with subsequent orders, entering payment account information into said patron database for later association with an order, automatically receiving identification information for said device when the order is placed, and using said device identification information to reference the patron's payment account information in the patron database for association with said order.

27. The method of claim 20, including the step of providing an order delivery confirmation code to confirm delivery of said order to enable charging the cost of said order to said patron payment account.

* * * * *

UNITED STATES PATENT AND TRADEMARK OFFICE
CERTIFICATE OF CORRECTION

PATENT NO.   : 6,473,739 B1
DATED        : October 29, 2002
INVENTOR(S)  : Robert S. Showghi and Scott Juds It is certified that error appears in the above-identified patent and that said Letters Patent is hereby corrected as shown below:

Drawings,
Sheets 1, 2, 3 and 4 of the drawings incorrectly bear the legend: "PROPOSED AMENDED DRAWINGS".

Signed and Sealed this

Fourth Day of February, 2003

JAMES E. ROGAN
*Director of the United States Patent and Trademark Office*